United States Patent
Groenewegen et al.

(10) Patent No.: US 12,039,304 B2
(45) Date of Patent: Jul. 16, 2024

(54) SYNTAX SUBTREE CODE STRENGTHENING

(71) Applicant: Microsoft Technology Licensing, LLC, Redmond, WA (US)

(72) Inventors: Peter Groenewegen, Sammamish, WA (US); Jui Hanamshet, Seattle, WA (US); German David Obando Chacon, Kirkland, WA (US); Mark Alistair Wilson-Thomas, Mercer Island, WA (US); Alexey Svyatkovskiy, Bellevue, WA (US); David Ellis Pugh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 17/856,859

(22) Filed: Jul. 1, 2022

(65) Prior Publication Data
US 2024/0004623 A1   Jan. 4, 2024

(51) Int. Cl.
*G06F 8/41* (2018.01)
*G06F 8/36* (2018.01)

(52) U.S. Cl.
CPC . *G06F 8/42* (2013.01); *G06F 8/36* (2013.01)

(58) Field of Classification Search
CPC ..... G06F 8/42; G06F 8/36; G06F 8/72; G06F 11/3608; G06F 8/33; G06N 5/01
See application file for complete search history.

(56) References Cited

U.S. PATENT DOCUMENTS

| | | | | |
|---|---|---|---|---|
| 8,640,101 B2* | 1/2014 | Spurlin | .................... | G06F 8/36 717/124 |
| 9,262,132 B1* | 2/2016 | Lugton | .................. | G06F 8/433 |
| 9,298,453 B2* | 3/2016 | Vangala | ..................... | G06F 8/75 |
| 9,400,889 B2* | 7/2016 | Chess | ........................ | G06F 9/44 |
| 10,048,945 B1* | 8/2018 | Makkar | ..................... | G06F 8/33 |

(Continued)

OTHER PUBLICATIONS

Dewey, David, Bradley Reaves, and Patrick Traynor. "Uncovering use-after-free conditions in compiled code." 2015 10th International Conference on Availability, Reliability and Security. IEEE, 2015. (Year: 2015).*

(Continued)

*Primary Examiner* — Matthew J Brophy
(74) *Attorney, Agent, or Firm* — Ogilvie Law Firm

(57) ABSTRACT

During software development, embodiments find various kinds of weak spots in source code and automatically suggest fixes to strengthen the code, without requiring developers to expressly select weakness finder mechanisms or fixer mechanisms by navigating a development tool's menu system. Weakness finders may analyze code using items such as hole detection, diagnostic errors, test results, changed code matches, prospective code discrepancies, generated code confidence scores, generated suggestion competition, and artificial intelligence. Weak spots and their context are submitted to weak spot fixers, which may generate fix suggestions using functionalities such as code synthesis, refactoring, autocompletion, retesting, and artificial intelligence. Fix candidate sets may be evaluated for consistency, diagnostic errors, and discrepancies. Snippets may be dynamically filled for presentation to a user.

20 Claims, 3 Drawing Sheets

(56) References Cited

U.S. PATENT DOCUMENTS

| | | | |
|---|---|---|---|
| 10,114,624 B1* | 10/2018 | Makkar | G06F 8/48 |
| 10,235,141 B2* | 3/2019 | Chacko | G06F 8/36 |
| 10,481,879 B2* | 11/2019 | Stevens | G06F 11/3664 |
| 10,671,356 B2* | 6/2020 | Makkar | G06F 8/36 |
| 10,776,106 B2* | 9/2020 | Sahu | G06F 8/75 |
| 10,782,946 B2* | 9/2020 | Makkar | G06F 11/3664 |
| 11,042,369 B1* | 6/2021 | Kimball | G06F 9/4843 |
| 11,074,047 B2* | 7/2021 | Makkar | G06F 8/33 |
| 11,200,143 B2* | 12/2021 | Jones | G06F 8/433 |
| 11,263,113 B2* | 3/2022 | Quemy | G06N 5/04 |
| 11,307,831 B2* | 4/2022 | Allamanis | G06F 8/33 |
| 11,474,892 B2* | 10/2022 | Chan | G06F 16/9024 |
| 11,507,354 B2* | 11/2022 | Makkar | G06F 8/72 |
| 11,507,655 B1* | 11/2022 | Ketireddy | G06F 8/70 |
| 11,579,868 B1* | 2/2023 | Zhang | G06F 8/72 |
| 11,599,404 B2* | 3/2023 | Chan | G06F 16/245 |
| 11,604,628 B2* | 3/2023 | Ni | G06N 3/045 |
| 11,645,192 B2* | 5/2023 | Zong | G06F 11/366 717/124 |
| 11,714,611 B2* | 8/2023 | Makkar | G06F 8/33 717/101 |
| 11,720,346 B2* | 8/2023 | Wu | G06F 8/70 707/741 |
| 2005/0114840 A1* | 5/2005 | Zeidman | G06F 8/71 717/126 |
| 2008/0320455 A1* | 12/2008 | Spurlin | G06F 8/36 717/115 |
| 2014/0013304 A1* | 1/2014 | Vangala | G06F 8/75 717/123 |
| 2014/0173563 A1* | 6/2014 | Dias | G06F 8/74 717/123 |
| 2015/0169295 A1* | 6/2015 | Kyoso | G06F 11/3604 717/109 |
| 2015/0268939 A1* | 9/2015 | Kelapure | G06F 8/70 717/111 |
| 2017/0212829 A1* | 7/2017 | Bales | G06F 11/3604 |
| 2018/0067837 A1* | 3/2018 | Singh | G06F 8/434 |
| 2018/0373507 A1* | 12/2018 | Mizrahi | G06F 18/24 |
| 2019/0079853 A1* | 3/2019 | Makkar | G06F 8/36 |
| 2019/0243617 A1* | 8/2019 | Stevens | G06F 8/42 |
| 2019/0243622 A1* | 8/2019 | Allamanis | G06F 8/433 |
| 2020/0005219 A1* | 1/2020 | Stevens | G06F 8/71 |
| 2020/0089491 A1* | 3/2020 | Sahu | G06F 8/75 |
| 2020/0097261 A1 | 3/2020 | Smith et al. | |
| 2020/0097389 A1 | 3/2020 | Smith et al. | |
| 2020/0218634 A1* | 7/2020 | Jones | G06F 11/3616 |
| 2020/0249918 A1 | 8/2020 | Svyatkovskiy et al. | |
| 2020/0249919 A1 | 8/2020 | Makkar | |
| 2021/0034335 A1 | 2/2021 | Svyatkovskiy et al. | |
| 2021/0182055 A1* | 6/2021 | Gross | G06F 8/24 |
| 2021/0182703 A1* | 6/2021 | Velammal | G06N 5/046 |
| 2021/0271455 A1 | 9/2021 | Svyatkovskiy et al. | |
| 2021/0279042 A1 | 9/2021 | Allamanis et al. | |
| 2021/0357187 A1 | 11/2021 | Clement et al. | |
| 2021/0357210 A1 | 11/2021 | Clement et al. | |
| 2021/0357307 A1 | 11/2021 | Deng et al. | |
| 2021/0357762 A1 | 11/2021 | Clement et al. | |
| 2021/0406152 A1* | 12/2021 | Quemy | G06F 11/3624 |
| 2022/0066747 A1 | 3/2022 | Drain et al. | |
| 2022/0066914 A1 | 3/2022 | Drain et al. | |
| 2022/0147321 A1 | 5/2022 | Svyatkovskiy et al. | |
| 2022/0164626 A1 | 5/2022 | Bird et al. | |
| 2022/0164672 A1 | 5/2022 | Bird et al. | |
| 2022/0188081 A1* | 6/2022 | Ni | G06F 9/453 |
| 2022/0222170 A1* | 7/2022 | Jones | G06N 20/00 |
| 2022/0236967 A1* | 7/2022 | Nasirishargh | G06F 8/33 |
| 2022/0405063 A1* | 12/2022 | Sato | G06F 11/3688 |

OTHER PUBLICATIONS

Sharma, Tushar, et al. "A survey on machine learning techniques for source code analysis." arXiv preprint arXiv:2110.09610 (2021). (Year: 2021).*

Daya Guo, et al., "Learning to Complete Code with Sketches", retrieved from « https://www.microsoft.com/en-us/research/publication/learning-to-complete-code-with-sketches/», Apr. 2022, 23 pages.

"Walkthrough: Create a code snippet", retrieved from « https://docs.microsoft.com/en-us/visualstudio/ide/walkthrough-creating-a-code-snippet?view=vs-2022#replacement-parameters», Jun. 7, 2022, 9 pages.

"OpenAI Codex", retrieved from « https://en.wikipedia.org/wiki/OpenAI_Codex», Jun. 9, 2022, 3 pages.

"Refactoring", retrieved from « https://code.visualstudio.com/docs/editor/refactoring», no later than Jun. 23, 2022, 4 pages.

Mary Jo Foley, "Microsoft to make coding 'in plain English' easier with PowerFx and GPT-3 AI model", retrieved from « https://www.zdnet.com/article/microsoft-to-make-coding-in-plain-english-easier-with-powerfx-and-gpt3-ai-model/», May 25, 2021, 5 pages.

"International Search Report and Written Opinion Issued in PCT Application No. PCT/US23/024628", Mailing Date: Sep. 22, 2023, 11 Pages.

* cited by examiner

| SOME EXAMPLES AND ASPECTS OF CODE WEAKNESSES 308 |
|---|
| SNIPPET 402 REPLACEMENT PARAMETER 404 | CODE TEMPLATE 406 GAP 408 |
| MATCH 410: DELETED OR REMOVED CODE 412, REMAINING CODE 414 |
| MATCH 416: PRIOR CODE 418, CURRENT CODE 420 | DIAGNOSTIC ERROR 422 |
| DISCREPANCY 424: PROSPECTIVE CODE 426, INSERTION TARGET CODE 428 |
| BEHAVIOR TEST 430 RESULT 432 | AI-BASED WEAKNESS FINDER 434, 210 |
| COMPARISON 436: GENERATED CODE BLOCK 438, RESIDENT CODE BLOCK 440 |
| CURSOR 442 LOCATION 444, CODE LOCATION 446 | VARIABLE 448 NAME 450 |
| WEAK SPOTS GROUP 452 CONSISTENCY 454 | ROUTINE 456 NAME 458 |
| STEP 466 | STATEMENT 460 | EXPRESSION 462 | IDENTIFIER 464 |
| SYNTHESIS OR GENERATION 468 | REFACTORING 470 | AUTOCOMPLETION 472 |
| CODE INSERTION 474 | CODE EDIT 476 | HOLE FILL 478 |

Fig. 4

| SOME EXAMPLES AND ASPECTS OF ANALYTIC ITEMS 500 |
|---|
| PREDEFINED HOLE 404, 408 DETECTION 502 FUNCTIONALITY 504 |
| DIAGNOSTIC FUNCTIONALITY 506 ERRORS 422 | TEST 430 RESULT 432 |
| MATCH 510 BETWEEN CHANGED PORTION 512 AND SEPARATE PORTION 514 |
| DISCREPANCY 424: PROSPECTIVE CODE 426, INSERTION TARGET CODE 428 |
| GENERATED CODE 438 CONFIDENCE SCORE 516 | AI WEAKNESS FINDER 434 |
| COMPETING 518 GENERATED SUGGESTIONS 214 | CODE CONTEXT 310 |
| CANDIDATE SET 324 EVALUATION 522 RESULT 524 | ANALYSIS OPERATIONS 314 |

Fig. 5

SYNTAX SUBTREE CODE STRENGTHENING

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers may use source code editors, compilers, debuggers, profilers and various other software development tools as they develop software. Although many advances have been made, improvements in software development technologies are still possible.

SUMMARY

Some embodiments described herein address technical challenges related to software development, such as how to find various kinds of weak spots in source code, and how to strengthen the source code at the weak spots. In particular, some embodiments promote efficient and effective software development by automatically using several kinds of weakness finders and automatically presenting a developer with suggestions from suitable weakness fixers for ways to strengthen the source code. A constituent technical challenge is how to define weak spots as objectively, comprehensively, and pragmatically as possible, such that an embodiment can be configured to find and fix most of the weak spots that could otherwise crop up later during manual code reviews, during code integration, or as defects in released code, for example.

Some embodiments are configured to automatically proffer a source code for weak spots analysis operations which collectively use multiple analytic items, such as predefined hole detection, diagnostic errors, code behavior test results, a match between a changed portion of the source code and a separate portion of the source code, a discrepancy between a prospective code and the source code, a generated code confidence score, competing generated suggestions, or an artificial intelligence code weakness finder functionality. Some embodiments automatically select a syntax subtree code which corresponds to a weak spot found by the weak spots analysis operations, automatically submit a context of the syntax subtree code to a weakness fixer, automatically receive a fix candidate from the weakness fixer in response to the context submission, and automatically present a code strengthening suggestion which is based on at least the fix candidate. Some embodiments receive a set of fix candidates, and automatically evaluate the fix candidates before presenting the code strengthening suggestion.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some examples and aspects of code weaknesses;

FIG. 5 is a block diagram illustrating some examples and aspects of analytic items.

DETAILED DESCRIPTION

Overview

Figure 1:
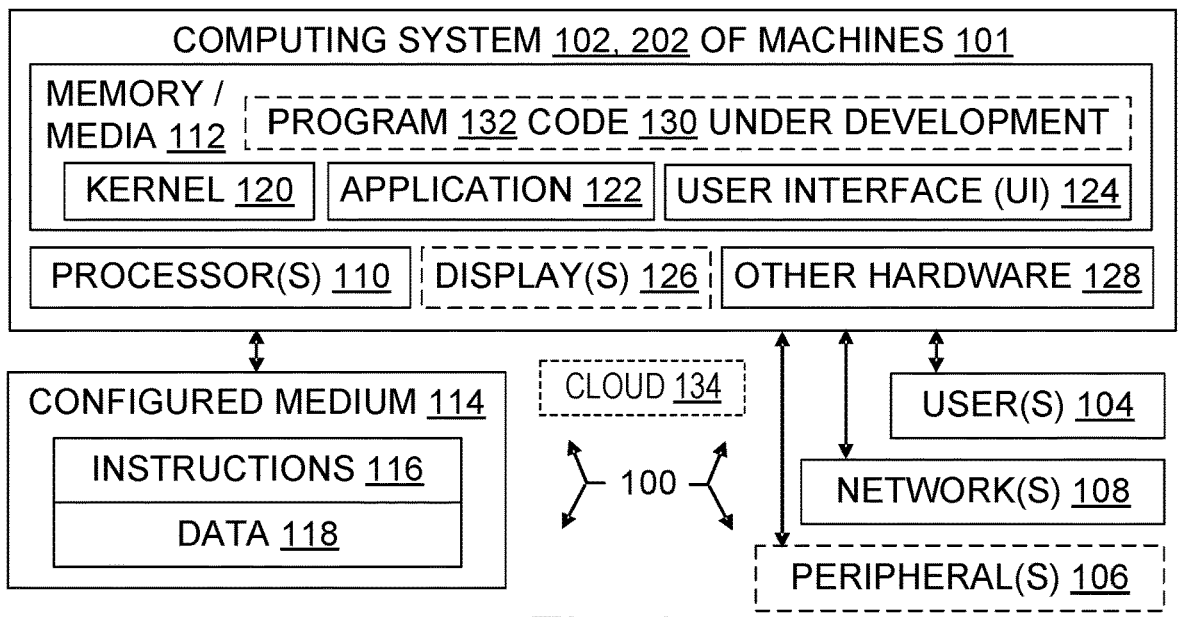
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to help software developers. Microsoft innovators explored various ways to effectively employ artificial intelligence (AI) functionalities to assist software development, and considered broader questions such as how development tools can support source code editing and promote improved code quality.

The innovators concluded it could be beneficial to integrate and coordinate in a single user interface some code analysis or optimization tools that have previously been used separately, or at different times, in an ad hoc manner. The innovators also decided that such integration and coordination could be designed and implemented in an overall tool management framework and a code development protocol that had room for orderly growth and adaptation as new functionalities became available to identify and address problems or potential issues in software under development.

One beneficial aspect of the integration and coordination conceived by the innovators is the recognition and accommodation of very different kinds of code weaknesses. For instance, one limited view is that a weak spot in source code is a place which has an issue of the sort a static analyzer or compiler might find. A different but also limited view is that a weak spot is a place of uncertainty in a block of code where a different piece of code could be substituted to provide a better fit with nearby code. Uncertainty may be treated as a likelihood that code at the spot will be changed, e.g., based on past edits or identified discrepancies. Yet another limited view is that a weak spot is a literal hole in the code made deliberately, as in a templated snippet, where there is no code present. Some embodiments described here encompass and accommodate all of these views. Some include other views of code weakness as well, such as those that view weak spots as problems found by unit testing, and those that view weak spots as something found by a machine learning model. A model may be trained, e.g., to spot security vulnerabilities, or to spot opportunities for better computational performance.

Informed by this discussion, and by other teachings herein, one of skill would acknowledge that development tools which offer suggestions to improve weak spots in the performance, accuracy, security, or style of code, for example, are likely to be most effective if those weak spots are defined as objectively, comprehensively, and pragmatically as possible in a given situation.

In this context, an objective definition is one that permits fully automatic identification of weak spots, without relying on human judgment to determine whether a given piece of source code contains any weak spot. Objective definitions of code weak spots do not prevent human review of code, but they may reduce the burden of human reviewers.

A comprehensive weak spot definition is one that covers different kinds of weaknesses. For instance, an embodiment might implement a weak spot definition that is sufficiently comprehensive to include at least three of the following weakness categories: static analyzer or compiler issue, literal hole, likely to change based on past edits, likely to change based on identified discrepancies, error found by unit testing, issue found by trained machine learning model. An even more comprehensive weak spot definition would include at least four of these weakness categories, or at least five, and so on, up to a fully comprehensive weak spot definition that includes all of the kinds of weak spots in the above list of weakness categories and all the kinds of weak spots taught anywhere else in the present disclosure.

A pragmatic weak spot definition is one that identifies weaknesses for which useful suggestions can be made by a tool to reduce or eliminate the weakness. For some weaknesses, automatic or AI-assisted fixers may be available, e.g., by code synthesis or automatic refactoring or autocompletion. For other weaknesses, such as some security vulnerabilities, automatic code fixing may not be available but a helpful approach can still be suggested, e.g., "send salted hashes instead of sending passwords in plain text."

Using embodiments described herein is not the only way to improve source code. One alternative approach would make code fixer suggestions available only on developer demand, e.g., via a menu selection which invokes a particular code fixer, without proactively surfacing tailored suggestions after proactively finding weak spots. This alternative approach has the disadvantage of putting a burden on the developer to know which code improvement suggestion mechanisms are available, and the disadvantage of requiring that the developer actively seek out the suggestion mechanisms by navigating the menu structure and then invoking them.

In short, finding weak spots in software code and offering suitable suggestions to fix them will improve developer efficiency and code quality. But leveraging this insight poses technical challenges such as how to define code weak spots objectively, comprehensively, and pragmatically, and how to provide a code strengthening framework which will accommodate availability changes or functionality changes in weakness finders and in weakness fixers.

Some embodiments described herein address these challenges. For example, some embodiments provide a specific, objective, comprehensive, and pragmatic list of weak spots which the embodiment can both find and offer to help fix. This beneficially provides developers with convenient and effective ways to improve code performance, accuracy, security, or style. These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Applications 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, code improvement functionality 206 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience, inclusion of an item in FIG. 1 does not imply that the item, or the described use of the item, was known prior to the current innovations.

More about Systems

Figure 2:
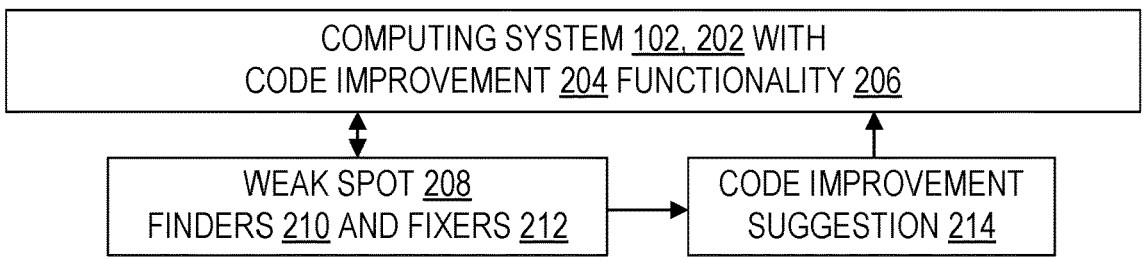
FIG. 2 is a diagram illustrating aspects of a computing system which has one or more of the code improvement enhancements taught herein.

FIG. 2 illustrates a computing system 102 configured by one or more of the code improvement enhancements taught herein, resulting in an enhanced system 202. Code improvement may also be referred to as "code strengthening" or "code optimization" herein. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
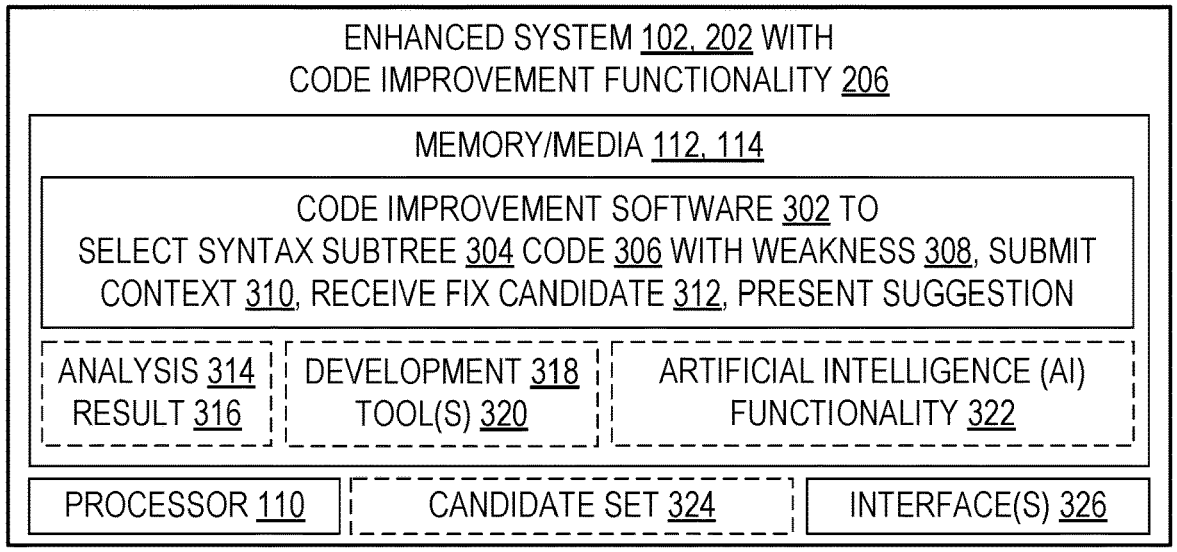
FIG. 3 is a block diagram illustrating an enhanced system configured with code improvement functionality.

FIG. 3 illustrates an enhanced system 202 which is configured with code improvement software 302 to provide functionality 206. Software 302 and other FIG. 3 items are discussed at various points herein, and additional details regarding them are provided in the discussion of a List of Reference Numerals later in this disclosure document.

FIG. 4 shows some examples of code weaknesses 308, and some aspects of code weaknesses 308. For instance, a gap 408 in code 130 is an example of a code weakness 308, and a prospective code 426 is an aspect of a code weakness which involves a discrepancy between a prospective code 426 and an insertion 474 target code 428. FIG. 4 items are discussed at various points herein, and additional details regarding them are provided in the discussion of a List of Reference Numerals later in this disclosure document.

FIG. 5 shows some examples of code strengthening analysis items 500, and some aspects of analysis items 500. Analysis items are also referred to as "analytic items" herein. For instance, detection 502 of a predefined gap 408 in code 130 is an example of an analytic item 500, and the predefined gap 408 is an aspect of that analytic item 500. FIG. 5 items are discussed at various points herein, and additional details regarding them are provided in the discussion of a List of Reference Numerals later in this disclosure document.

FIGS. 1 through 5 are not themselves a complete summary of all approaches to defining a code weakness 308, either as to a category or as to a particular weak spot 208. Nor are they a complete summary of all aspects of an environment 100 or system 202 or other computational context of code 130 under development. FIGS. 1 through 5 are also not themselves a complete summary of all weak spot finders 210, weak spot fixers 212, or other code improvement functionalities for potential use in a system 202. Nor are they a complete summary of all fix candidates 312, code improvement suggestions 214, or other data structures or other mechanisms for potential use in a system 202.

In some embodiments, the enhanced system 202 may be networked through an interface 326. An interface 326 may include hardware such as network interface cards, software such as network stacks, APIs, or sockets, combination items such as network connections, or a combination thereof.

In some embodiments, an enhanced system 202 includes a computing system 202 which is configured to facilitate source code development by helping improve a source code. The enhanced system 202 includes a digital memory 112 and a processor 110 in operable communication with the memory. In a given embodiment, the digital memory 112 may be volatile or nonvolatile or a mix. The enhanced system 202 also includes a software development tool 320 having a user interface 124. The enhanced system 202 also includes at least one processor 110 in operable communication with the digital memory 112. The at least one processor is configured to collectively perform syntax subtree code strengthening 620 including: finding 606 a weak spot 208 in the source code 130, selecting 608 a syntax subtree code 306 which corresponds to the weak spot, submitting 610 a context 310 of the selected syntax subtree code to a weakness fixer 212 which is based on an artificial intelligence service 322 which provides or utilizes code strengthening functionality, receiving 612 a fix candidate 312 from the weakness fixer in response to the submitting, and presenting 618 a code strengthening suggestion 214 based on at least the fix candidate. The artificial intelligence service can reside locally or remotely and may be distributed across multiple devices.

In some embodiments, the system 202 includes a weakness finder 210 which is configured to select the syntax subtree code by finding 606 at least one of the following weaknesses 308: a replacement parameter 404 in a code snippet 402; a predefined gap 408 in a code template 406; a match 410 between a deleted code 412 and a remaining code 414 (e.g., a weak spot exists in that code matching the weak spot was deleted by the user); a match 410 between a removed code 412 and a remaining code 414 (e.g., code matching a weak spot was removed by a trained machine learning model); a match 416 between a prior version 418 of an edited 476 code and a portion of current code 420 (e.g., a weak spot exists in that code matching the weak spot was edited by a user); a discrepancy 424 between a paste prospect 426 and an insertion target source code 428 (e.g., code that was cut and is now being pasted has different variable names 450 or function names 458 than code near the paste insertion 474 point); a discrepancy 424 between a generated code 426, 438 and an insertion target source code 428 (e.g., code 438 generated by a Microsoft PROSE™ framework or by GPT-3 has different variable names 450 or function names 458 than code near the prospective insertion point of that code 438); a diagnostic error 422 (e.g., as indicated by output from a lint tool 506 or a compiler 506 or static analysis tool 506); or a code behavior test result 432 (e.g., code at the weak spot failed a unit test 430 for accuracy or performance or security or some other quality).

In some embodiments, the system 202 includes a weakness finder 210 which is based on an artificial intelligence code weakness finder functionality 322. For example, an AI-based weakness finder 210, 434 may include a trained machine learning model that identifies some code as a weak spot because that code is likely to be changed. It may be likely to change, e.g., because it follows a code anti-pattern. Two of the many examples of anti-patterns include hard-coded numeric constants in routine calls instead of named constants, and large classes that import or depend on or control many other classes. A machine learning model 434 may be trained to spot these anti-patterns using manually labeled examples culled from public or private repositories or other code sources.

In some embodiments, the system 202 includes a weakness finder 210 which is configured to select the syntax subtree code based on at least a comparison 436 of an automatically generated block of code 438 to a resident block of code 440. Such a weakness finder may find 606 a weak spot by comparing what is currently there in the code being analyzed 314 (the "resident" code) to what could be suggested as a result of autocompletion 472 or code synthesis 468 (the "automatically generated" code) based on context. In one approach, the context for the code generator includes the resident code, and in another approach, the context for the code generator excludes the resident code.

In some embodiments, PROSE™ or similar pattern-detection technology 322, 468 is used to compare abstract syntax subtrees 304 to compute a transform or difference between the resident code 440 and the prospective suggestion 438 (mark of Microsoft Corporation), as a weakness finder 210. The amount or severity of diagnostic results after code changes may also be employed as a measure of distance between the resident code 440 and the prospective suggestion 438. A model trained to identify changes in code which are not optimal may be employed. In some embodiments, the larger the difference is between the resident code and the prospective suggestion when the generated code has a high confidence score 516, the weaker the resident code is considered.

One of skill informed by the teachings of the present disclosure will acknowledge that embodiments may be selected and configured to provide various technical benefits. For example, code improvement functionality 206 as described herein reduces the burden on human code 130 reviewers and results in more effective code reviews by resolving issues that could otherwise consume code review time and effort.

A given code review may be done by a code reviewer alone, or by a reviewer together with the developer who wrote the code, for example. In either case, code review personnel such as senior developers are often in short supply, and they often face a backlog of code 130 awaiting their review. During a review of a program's code, the quality and commercial viability of the program may be enhanced most if the reviewers focus their attention on program capabilities and the user experience, which puts pressure on the developer to have working code that can be reviewed. Code improvement functionality 206 helps developers produce working code 130 for review.

These example scenarios are illustrative, not comprehensive. One of skill informed by the teachings herein will recognize that many other scenarios and many other variations are also taught. In particular, different embodiments or configurations may vary as to the number or precise workings of the weak spot finders 210, weak spot fixers 212, and code improvement software 302, for example, and yet still be within the scope of the teachings presented in this disclosure.

Other system embodiments are also described herein, either directly or derivable as system versions of described processes or configured media, duly informed by the extensive discussion herein of computing hardware.

Although specific code improvement architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations of code improvement suggestions 214 as well as different technical features, aspects, security controls, mechanisms, decision criteria, expressions, hierarchies, operational sequences, environment or system characteristics, or other code improvement functionality teachings noted herein, and may otherwise depart from the particular illustrative examples provided.

Processes (a.k.a. Methods)

Figure 6:
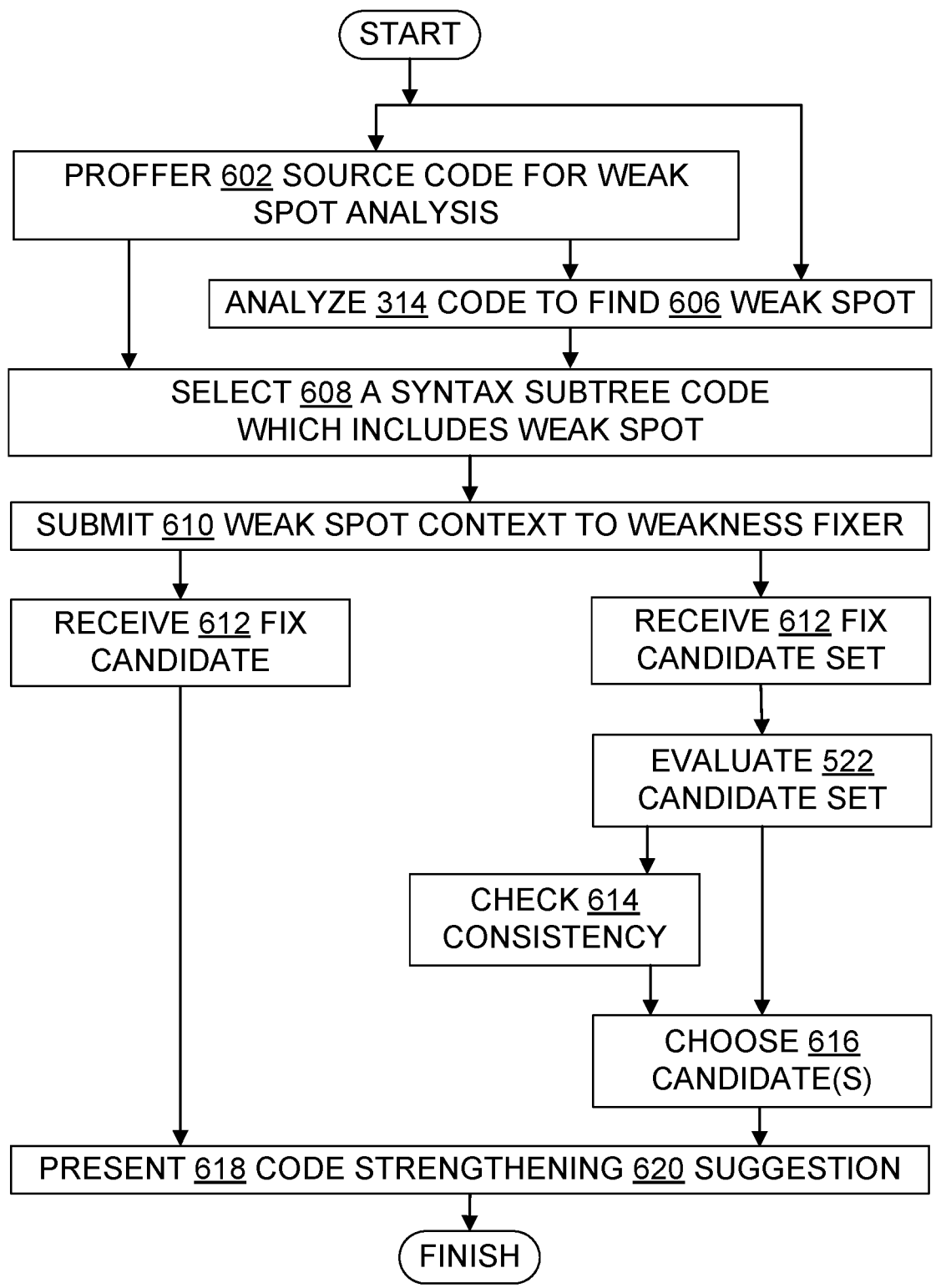
FIG. 6 is a flowchart illustrating steps in some methods for code improvement.

Methods (which may also be referred to as "processes" in the legal sense of that word) are illustrated in various ways herein, both in text and in drawing figures. FIG. 6 illustrates a family of methods 600 that may be performed or assisted by an enhanced system, such as system 202 or another code improvement functionality enhanced system as taught herein. FIGS. 1 through 5 show code improvement architectures with implicit or explicit actions, e.g., steps for collecting data, transferring data, storing data, and otherwise processing data.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as an identifier 464. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 6. Arrows in method or data flow figures indicate allowable flows; any arrows pointing in more than one direction thus indicate that flow may proceed in more than one direction. Steps may be performed serially, in a partially overlapping manner, or fully in parallel within a given flow. In particular, the order in which flowchart 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method 600 for source code improvement, the method performed (executed) by a computing system, the method including automatically: proffering 602 the source code for weak spots analysis operations 314 which collectively use at least three of the following analytic items 500: predefined hole detection 502, diagnostic errors 422, code behavior test results 432, a match 510 between a changed portion 512 of the source code and a separate portion 514 of the source code, a discrepancy 424 between a prospective code 426 and the source code 428, a generated code 438 confidence score 516, competing 518 generated suggestions 214, or an artificial intelligence code weakness finder functionality 434; selecting 608 a syntax subtree code 306 which corresponds to a weak spot 208 found by the weak spots analysis operations; submitting 610 a context 310 of the syntax subtree code to a weakness fixer 212; receiving 612 a fix candidate 312 from the weakness fixer in response to the submitting; and presenting 618 a code strengthening suggestion 214 based on at least the fix candidate.

In some embodiments, the weakness 308 corresponds to a replacement parameter 404 in a code snippet 402, and the context 310 of the syntax subtree code includes at least a portion of the snippet adjacent to the replacement parameter. In some embodiments, the weakness 308 corresponds to a gap 408 in a code template 406, and the context 310 of the syntax subtree code includes at least a portion of the template adjacent to the gap. Gaps 408 and replacement parameters 404 are examples of "holes" in code, that is, an opening where code is to be placed.

Some embodiments involve code insertion 474, such as a cut-and-paste with the paste as code insertion, insertion of automatically generated code by autocompletion, insertion of a snippet, renaming, or automatic refactoring. Note that autocompletion 472, snippets 402, code synthesis 468, and automated refactoring 470 are treated herein as examples of automatically generating code for insertion.

In particular, in some embodiments the weakness 308 corresponds to a discrepancy 424 between an insertion prospect 426 and an insertion target source code 428, and the context 310 of the syntax subtree code includes at least a portion of the insertion prospect 426, or at least a portion of the insertion target source code 428, or both.

In some embodiments, the software 302 receives 612 a set 324 of several suggestions 312, and chooses 616 an optimal one or an optimal subset to present 618 to the user. The set 324 of fix candidates 312 can collectively come from one or more weakness fixers 212, e.g., the set may include several candidates from a single model 322, or one respective candidate from each of several different models 322. The optimal subset (which may contain one or more candidates)

may be chosen based on a ranking 524. Ranking 524 may be based, e.g., on the number of compiler errors 422 generated, similarity in the use of variable names 450, number of unit tests 430 passed, code generator confidence scores 516, or a combination thereof, for example.

In particular, in some embodiments the method includes: receiving 612 a candidate set 324 which includes multiple fix candidates 312; evaluating 522 the candidate set; choosing 616 a fix candidate for presentation, based on at least a result 524 of the evaluating; and presenting 618 the code strengthening suggestion 214 based on at least the fix candidate.

In autocompletion scenarios, a hole starts at an edit cursor 442 location 444, and the hole can be filled by one or more source code tokens in sequence using autocompletion. A "token" may be, e.g., an identifier 464, or a programming language keyword, or syntactic glue such as parentheses, braces, brackets, commas, periods, or semicolons.

A hole to be filled by a sequence of contiguous tokens is one example of a weak spot 208. However, in some circumstances, a weak spot is not located next to the edit cursor. For example, assume a developer is pasting code which makes a function call to foo(x,y,z). An embodiment may find a hole at the location 446 of the third parameter z when the caret 442 is at the location 444 of the first parameter x. As another example, assume a developer is pasting in a full function definition of foo(x,y,z){ }. An embodiment may find 606 that the parameter x is a hole, and find that all references to x inside the pasted function would also be holes.

As a third example, assume the cursor is in a body of a pasted 474 method or other pasted code block. Assume the developer is doing a copy paste, edit, paste, edit sequence of editing operations 476. The embodiment will thus have some examples of how code is edited after the same block is pasted. The embodiment can incorporate the changes into the next paste, which becomes effectively a unitary paste-and-edit when the embodiment applies the changes learned in the earlier edits.

In short, in some embodiments, the source code 130 is displayed in a tool 320, a cursor 442 is positioned in the source code at a cursor location 444, and the syntax subtree code 306 is at a syntax subtree code location 446 which is not adjacent to the cursor location and does not include the cursor location.

In some circumstances, source code includes a group of related weak spots, e.g., holes in a snippet with intervening pieces of snippet code, or a function foobar(x,y) with a body in which references to x and y inside the function are related holes. Some embodiments check a corresponding set of suggested fixes for consistency with each other. This may be particularly beneficial when different potential fixes 312 come from different fixer models 212. An embodiment may check the proposed fixes for the individual holes to see if they are consistent with each other, e.g., by compiler checks or semantic filtering on the proposed insertion set to catch inconsistent variable name usage.

More generally, in some embodiments the syntax subtree code exhibits a group 452 of weak spots 208 at non-adjacent locations 446 in the syntax subtree code, and the method includes submitting 610 the context 310 of the syntax subtree code to at least one weakness fixer; receiving 612 a set 324 of fix candidates from the at least one weakness fixer in response to the submitting; checking 614 fix candidates of the set for consistency 454 with one another; and presenting 618 the code strengthening suggestion based on at least two of the fix candidates of the set. Note that the set 324 of fix candidates could be received as a group or individually, from one or more fixers 212.

Some embodiments include weak spots analysis operations 314, wherein analyzing 314 the source code for weak spots uses at least a match 510 between a changed portion 512 of the source code and a separate portion 514 of the source code. In some of these, the weak spot found by the analyzing exhibits a weakness in that the separate portion contains at least one of the following which is not present in the changed portion: a variable name 450, a routine name 458, an expression 462 configured to yield a value upon evaluation, or a program statement 460. Note that the changed portion 512 could be changed by way of code deletion, code removal, or other code editing.

Some embodiments include weak spots analysis operations 314, wherein analyzing 314 the source code for weak spots uses at least one of the following discrepancies 424 between the prospective code 426 and the source code that includes the insertion target 428: the prospective code contains an identifier 464 which is not present in the source code 428, or the source code 428 contains an identifier 464 which is not present in the prospective code.

Some embodiments include weak spots analysis operations 314, wherein analyzing 314 the source code for weak spots uses at least competing 518 generated suggestions 214. Note that reference numeral 214 applies to suggestions at either or both of two stages, namely, suggestions received 612 from a fixer 212, and suggestions presented 618 to a developer via a user interface 124. The competing 518 refers to suggestions received 612 from a fixer 212, e.g., a set 324 of competing suggestions is a set in which no suggestion has a confidence score that is greater by a specified threshold than the confidence scores of the other suggestions in the set.

Some embodiments include weak spots analysis operations 314, wherein analyzing 314 the source code for weak spots uses at least an artificial intelligence code weakness finder functionality 322, 210.

Some embodiments include weak spots analysis operations 314, wherein analyzing 314 the source code for weak spots uses at least four of the analytic items 500, or at least five of the analytic items 500, or at least six of the analytic items 500, for example.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as code improvement software 302, finders 210, fixers 212, syntax subtree codes 306, fix candidates 312, and code context 310, in the form of data 118 and instructions 116, read from a removable storage medium 114 and/or another source such as a network connection, to form a configured storage medium. The configured storage medium 112 is capable of causing a computer system 102 to perform technical process steps for source code improvement, as disclosed herein. The Figures thus help illustrate configured storage media embodiments and process (a.k.a. method) embodiments, as well as system and process embodiments. In particular, any of the process steps illustrated in FIG. 6 or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method 600 to optimize 620 a source code. This method includes: proffering 602 the source code for weak spots analysis operations 314 which collectively use at least five of the following analytic items 500: predefined hole 404 or 408 detection functionality 504, diagnostic errors 422, code behavior test results 432, a match 510 between a changed portion of the source code and a separate portion of the source code, a discrepancy 424 between a prospective code and the source code, a generated code confidence score 516, competing 518 generated suggestions, or an artificial intelligence code weakness finder functionality 434; selecting 608 a syntax subtree code which corresponds to a weak spot found by the weak spots analysis operations; submitting 610 a context of the syntax subtree code to a weakness fixer; receiving 612 a fix candidate from the weakness fixer in response to the submitting; and presenting 618 a code strengthening suggestion based on at least the fix candidate.

In some embodiments, the method includes proffering the source code for weak spots analysis operations 314 which collectively use at least six of the analytic items 500.

In some embodiments, the method includes the weak spots analysis operations 314, and analyzing 314 the source code for weak spots uses at least diagnostic errors 422.

In some embodiments, the method includes the weak spots analysis operations 314, and analyzing 314 the source code for weak spots uses at least predefined hole detection 502. For example, instead of merely offering a developer a static collection of code snippets, an embodiment may go further by treating the snippet holes as weak spots, submitting context 310 of the holes to a code generator such as GPT-3 or PROSE™, receiving 612 suggestions to fill 478 the holes in a manner consistent within the snippet and consistent with the code 130 preceding the snippet, and presenting 618 a filled-in snippet instead of one with holes to be filled manually by the developer.

In some embodiments, the method includes the weak spots analysis operations 314, and analyzing 314 the source code for weak spots uses at least code behavior test results 432.

Additional Observations

Additional support for the discussion of source code improvement functionality 206 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments use or provide AI-based weakness finders and fixers for code blocks or expressions for editing support, code quality, refactoring suggestions, unit testing, and other software development operations 318. Code blocks 438, 440 and expressions 462 are examples of syntax subtree codes 306.

Some embodiments identify spots where a developer 104 should (or must) replace or fix a code block. Then these embodiments suggest one or more useful fixes or replacements for the code block, and allow the user 104 to select and easily install the useful fix or replacement.

Some embodiments can fill in subtree code 306 by using AI models. The subtree code 306 corresponds to a missing or broken part of an abstract syntax tree 304. The subtree code 306 may be, e.g., blocks in the code such as one or more contiguous statements 460, or an expression 462. Suggestions 214 may be presented in the middle of the code as edits or gray text, or be presented in a snippets 402 user interface.

Some embodiments suggest code fixes based on unit tests. If a testing tool runs ten unit tests and one fails (due to inaccurate behavior, sub-optimal performance, insecurity, etc.), the failure message may indicate a block that is likely broken. Then the enhanced system may invoke an AI fixer on that block to generate a possible fix 312 for the code. The fix can be checked by running the unit tests before it is suggested.

Some embodiments check blocks or expressions to determine if code has an issue 308 by comparing 436 what 440 is currently there and what 438 would have been suggested for the code block or expression. A trained machine learning model 322 ranks the suggestion 438 versus the implementation 440 to determine how likely it is that the implementation is faulty 308.

In some embodiments, ways to identify 314 a block or expression which should or must be filled in or replaced include finding 606 missing parts 404 in snippets 402, matching deleted code 412, diagnostics 422, matching removed parts 412 in the code, and invoking a trained machine learning model 434 that identifies code to be fixed. The same trained machine learning model 434 or a different trained machine learning model 434 may also suggest options 214 for strengthening the code.

In some embodiments, suggestion presentation 618 traverses holes in a snippet or template, presenting fix candidate(s) for each hole in turn.

In some embodiments, suggestions 214 are presented 618 as gray text, e.g., digital text which is lighter, thinner, smaller, or otherwise less visually prominent than nearby text. Despite the name, gray text is not necessarily gray in color.

Some embodiments show 618 what broken code 306 would look like if replaced with working code per a suggestion 214.

Some embodiments present 618 an option at a unit test result display to fix the code that failed the unit test. For example, a quick action that shows the comparison 436 as a diff. A quick action is a command or functionality to modify code with a single UI gesture or action.

Some embodiments change user interface focus to the file to be fixed, with a suggested fix 312 displayed in the UI, e.g., as a diff or as gray text.

As an example interaction, assume a snippet starts with the keyword "if", and assume an embodiment is configured to respond to a TAB key by flowing through the snippet and filling 478 holes with generated 468 code. Then the user interface content:

```
if[TAB]
would be transformed automatically to:
    if (<auto fill>|) {
    <auto fill>
    }
``` where <auto fill> indicates a hole filled (or to be filled) based on a suggestion 214, and | indicates a cursor location.

As another example interaction, assume an embodiment is configured to respond to a code deletion by offering 618 generated code to replace the deleted code. Then the user interface content:

```
if (x==true)
{
// some code
}
would be changed by the deletion into:
if ( )
{
// some code
}
which would then in turn be transformed automatically to:
if (|<suggestion in gray text>)
{
// some code
}
```

As another example interaction, assume an embodiment is configured with an AI-based finder 210 and an AI-based fixer 212. The finder might find likely broken code due to a faulty expression, such as:
    bool IsEmailAddress(string email)=>string.IsNullOrEmpty(email) && emailregex.Match(email);
Then the fixer might generate a suggestion such as one to add a logical not (indicated by "!") to transform the code into:
    bool IsEmailAddress(string email)=>!string.IsNullOrEmpty(email) && emailregex.Match(email);
The AI-based finder and AI-based fixer could be trained on labeled data which includes common mistakes and their respective fixes. Such common mistakes may include, e.g., a missing not operator (e.g., "!"), missing brackets or braces or parentheses or periods or semicolons, transposed characters, extra white space in identifiers, confused operators (e.g., "&&" versus "&", "==" versus "=", "^" versus "**"), Boolean algebra errors, and the like.

Some embodiments utilize testing code coverage data to find one or more blocks that are likely to have an issue 308 after tests are not entirely passed. Some embodiments invoke a trained machine learning model to regenerate the weak 308 block or expression and rerun the tests. Although only the failed tests are rerun in some situations, in other situations as a precaution all tests are rerun, starting with the ones that failed and then moving to the ones that did not, in case the fix broke something else.

Some embodiments identify the issue 308 and help fix the issue in the current tool context, without forcing the user to switch out of an interface that is being used to write the unit tests.

In some embodiments, the identification of broken or otherwise weak blocks is done by a model trained using code under unit tests, in a training procedure in which one expression is changed, and the expression change and the resulting test outcome is fed to the model as training data, then a different change is made, test outcomes and the change are fed to the model as training data, and so on. That is, a difference in unit tests resulting from expression changes is used to find weaknesses, and possibly also to suggest fixes, per the trained model.

Some embodiments run the finder 210 automatically at particular points in a build or an integration or a deployment. For example, in some embodiments a bot running finders 210 looks for mistakes in newly inserted code in conjunction with a repository pull request.

Some embodiments help a user edit code faster and with more confidence in the resulting code. The user gets assistance at places it does not necessarily get assistance currently. Some embodiments illustrate by their suggestions that the editor tool has a pragmatic functional understanding of what the user is doing.

Some embodiments provide a mechanism for identifying and fixing code blocks. Unit tests, syntax errors, missing code, or other code anomalies 308 may be used to identify code 306 that should be fixed. After the code is identified, context 310 such as code before and after the identified code may be provided to a model to determine replacement code. The replacement code may be inserted and actions may be taken to determine whether the replacement code is correct. For example, unit tests may be executed which verify whether the code is correct.

One of skill understands there are significant technical benefits to the teachings and embodiments discussed herein. For example, an alternative would be an ad hoc approach using a smaller set of tools for spotting issues and remediating them. Code snippets and code templates display holes, but are not integrated with fixers 212 for filling those holes with code that is syntactically and semantically suitable. Autocompletion displays completion candidates, but proceeds in a linear manner by adding one or more adjacent tokens at the current cursor location. Lint tool output, compiler errors, and similar diagnostic results identify issues at more or less the accurate location (depending on the diagnostic tool), but are not always integrated with fixers 212 for suggesting fixes to correct those issues. Code synthesis tools may be available only on express developer demand, instead of being invoked automatically in response to finding 606 a weak spot. Moreover, synthesized code is not necessarily evaluated 522 for discrepancies 424, errors 422, or internal consistency 454 as taught herein before it is shown to a user.

In contrast, some embodiments find a weak spot in a source code, select a syntax subtree code which corresponds to the weak spot, submit a context of the selected syntax subtree code to a weakness fixer which is based on an artificial intelligence code strengthening functionality, receive a fix candidate from the weakness fixer in response to the submitting, and present a code strengthening suggestion based on at least the fix candidate. This provides technical benefits such as improving software developer productivity and improving software quality. Finding a weak spot in code, getting a possible fix for the weak spot from an AI-based weakness fixer, and suggesting the fix to the developer is a beneficial enhancement to software development.

Technical Character

The technical character of embodiments described herein will be apparent to one of ordinary skill in the art, and will also be apparent in several ways to a wide range of attentive readers. Some embodiments address technical activities such as analyzing 314 program code, selecting 608 a syntax subtree code 306, executing a machine learning model 322, testing 430 software, and software development 318, which are each an activity deeply rooted in computing technology. Some of the technical mechanisms discussed include, e.g., weak spot finders 210, weak spot fixers 212, code improvement software 302, user interfaces 124, AI-based functionalities 322, and software development tools 320. Some of the technical effects discussed include, e.g., improving software developer 104 productivity and improving software quality for a broad range of software 130. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

In some embodiments, a weakness finder is configured to select the syntax subtree code by finding at least one of the following weaknesses: a replacement parameter in a code snippet, a predefined gap in a code template, a match between a deleted code and a remaining code, a match between a removed code and a remaining code, a match between a prior version of an edited code and a portion of current code, a discrepancy between a paste prospect and an insertion target source code, a discrepancy between a generated code and an insertion target source code, a diagnostic error, or a code behavior test result. This provides technical benefits such as improving software developer productivity and improving software quality for a broad range of software by finding a variety of different kinds of weak spots in code.

In some embodiments, the weakness corresponds to a replacement parameter in a code snippet, and the context of the syntax subtree code includes at least a portion of the snippet adjacent to the replacement parameter. This provides technical benefits such as improving software developer productivity and improving software quality by transforming static code snippets to dynamic code snippets which have tailored automatically generated content.

In some embodiments, the source code is displayed in a tool, a cursor is positioned in the source code at a cursor location, and the syntax subtree code is at a syntax subtree code location which is not adjacent to the cursor location and does not include the cursor location. This provides technical benefits such as improving software developer productivity and improving software quality by improving code in a way that mere linear autocompletion does not.

In some embodiments, the weakness corresponds to a discrepancy between an insertion prospect and an insertion target source code. This provides technical benefits such as improving software developer productivity and improving software quality by broader and more tailored use of autocompletion, snippets, code synthesis, and automated refactoring.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas, they are not. Rather, the present disclosure is focused on providing appropriately specific embodiments whose technical effects fully or partially solve particular technical problems, such as how to find various kinds of weak spots in source code, and how to strengthen the source code at the weak spots. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other embodiment implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
SIEM: security information and event management, or tool for the same
TPU: tensor processing unit UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., timesliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device 218 or IoT device 218. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Code improvement operations such as communicating 602, 612 with a code weakness finder 210 or a code weakness fixer 212, analyzing 314 code, selecting 608 and syntax subtree code 306, matching 410, 416 codes, comparing 436 codes, generating 438 code, diagnosing 422 code, and many other operations discussed herein, are understood to be inherently digital. A human mind cannot interface directly with a CPU or other processor, or with RAM or other digital storage, to read and write the necessary data to perform the code improvement steps 600 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as analyzing, checking, choosing, communicating, comparing, evaluating, finding, fixing, generating, matching, presenting, proffering, ranking, receiving, selecting, strengthening, submitting, suggesting, synthesizing, testing (and analyzes, analyzed, checks, checked, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202, such as a developer or programmer; refers to a human or a human's online identity unless otherwise stated
- 106 peripheral device
- 108 network generally, including, e.g., LANs, WANs, software-defined networks, clouds, and other wired or wireless networks 110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 applications, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 program code of program under development, e.g., source code, object code, executable code, program resources such as images, and so on; may also be referred to as the program 130; project configuration or program configuration are treated as part of program code herein
132 program or software generally, e.g., applications 122, kernels 120, development tools 310
134 cloud, cloud computing environment
202 system 102 enhanced with code improvement functionality 206
204 code improvement; also referred to as code optimization; may refer to an optimization of a program 130 or to an optimization of the benefits of invoking functionality 212, or both
206 code improvement functionality; e.g., software or specialized hardware which performs or is configured to perform at least steps 602 or 606 plus at least steps 610, 612, and 618, or any software or hardware which performs or is configured to perform a method 600 or a code improvement activity first disclosed herein
208 weak spot in code 130, e.g., a spot where code is missing, or where the code that's present is incomplete or is likely to be replaced; some examples include: predefined holes such as replacement parameters in snippets or sketches or other templates; errors found by a compiler or by lint or by a static analysis tool; identifiers in pasted code or generated code; edited portions of code in a copy-paste-edit-paste-again-elsewhere sequence; edited initial portion of code in a copy-paste; code that resembles deleted code; code that failed a unit test; generated code that has a low confidence score from the code generator; code for which a code generator offers several competing suggestions with about the same confidence score; code for which a code generator offers several similar suggestions, e.g., variable names; and code identified as a weak spot by AI functionality (e.g., a model or an expert system) that is trained or configured to identify weak code (this may include scanning comments for indications, e.g., "to do")
210 weak spot finder; functionality configured to find a weak spot 208; computational
212 weak spot fixer, e.g., an artificial intelligence service which has functionality configured to generate a possible fix for a weak spot 208; computational
214 suggestion of a possible fix for a weak spot 208; digital
302 code improvement software, e.g., software which upon execution performs at least steps 602 or 606 plus at least steps 610, 612, and 618
304 non-empty abstract syntax tree or non-empty subtree of an abstract syntax tree; collectively referred to as a "syntax subtree"; digital
306 syntax subtree code, i.e., a portion of code or a weak spot of code, or both, which corresponds to a given syntax subtree or to a given hole in a syntax subtree; digital
308 weakness in code, as represented in a system 202; for convenience, "weakness" may be used interchangeably with "weak spot", but a distinction may also be made when "weak spot" refers to a particular instance of a weakness 308, e.g., a particular block of prospective code 426 may be a weak spot because it exhibits a weakness 308 which is a discrepancy 424 between identifiers 464 used in the prospective code 426 and identifiers 464 used in the target code 428 that is receiving or will receive or has received the prospective code 426 via pasting (pasting is an example of code insertion)
310 context of a weak spot, e.g., code adjacent to the weak spot (may include comments), included or imported code; code including the weak spot, an indication of the kind of weakness, an indication of the tool 320 operation being performed when the weak spot was found, an indication of deleted code or removed code or prior code or generated code or other aspect of code, an indication of test identification or testing result or both, tool 320 state such as cursor location, project identification, or data of the kind used to train a fixer to which the context is being submitted, or a combination of one or more of the preceding; digital
312 fix candidate, as represented in a system 202; a suggestion 214 may include one or more fix candidates, and may also include related data such as a confidence score 516 or explanatory text directed at a user, for instance; digital
314 analysis of at least part of a program 130 to look for weak spots, e.g., any analysis operations which are performed to find a weakness shown in FIG. 4 or which utilize any of the analytic items shown in FIG. 5; computational
316 a result of an analysis 314, e.g., identification of an issue 308; may also include one or more possible mitigations to resolve the issue; digital
318 software development, as represented or performed in a system 202
320 software development tool, e.g., any tool 122 utilized in editing, building, testing, profiling, analyzing, deploying, or monitoring code 130; may be enhanced with functionality 206
322 trained machine learning model, expert system, or other artificial intelligence-based functionality; for instance, a transformer-based model such as Grammformer that generates code based on a programming language grammar and can predict hole tokens, or a PROSE™ based code synthesizer, or a GPT-3 based code generator; computational
324 set of one or more fix candidates 324; the set may include multiple suggestions to strengthen a particular weak spot, or contain multiple suggestions directed at strengthening respective different weak spots, or both; digital 326 interface generally; computational
402 code snippet; a short piece of code that can be inserted using fewer keystrokes than if each character in the snippet were typed; may be part of a template 406; digital
404 replacement parameter in code snippet; a place where code is not yet present but is likely needed; e.g., in a code snippet "if < > { }" the < > indicates a replacement parameter; a replacement parameter is an example of a hole in code
406 code template; outline or scaffold or partially completed example that may contain one or more snippets and other data, e.g., file or directory structures, tool settings, etc.; digital
408 gap in a code template; a place where code is not yet present but is likely needed, e.g., a replacement parameter in a snippet or a directory name or file name in a file system subtree template; a gap in code is an example of a hole; digital
410 match between a deleted code 412 or a removed code 412 and a remaining code 414; match may be exact or partial or within a specified tolerance under a text distance metric; e.g., if a user deleted the same or similar text before, then the likelihood increases that this match exhibits a weakness because the user will delete the matching text as well; numeral 410 refers to the computational activity of determining whether a match is present, and to the digital result of such activity, depending on context
412 code deleted from a code 130 by user action, or code removed from a code 130 by model or other automated action; digital
414 code remaining in a program 130 (or portion thereof) after a deletion or removal of other code 412; digital
416 match between a prior code 418 and a current code 420; match may be exact or partial or within a specified tolerance under a text distance metric; numeral 416 refers to the computational activity of determining whether a match is present, and to the digital result of such activity, depending on context
418 prior version of a piece of code; digital
420 current version of a piece of code; digital
422 code diagnosis by linting, compilation, or other static analysis; numeral 422 refers to the computational activity of performing static analysis, and to the digital result of such activity, depending on context
424 discrepancy between a prospective code 426 and an insertion target code 428; discrepancy may be any difference in identifiers, for example, or be at least a specified amount or kind of differences; e.g., a discrepancy between a paste prospect and an insertion target source code when the code being pasted has different variable names than code near insertion point, or when user edits indicate that the intent for the pasted code is different at the insertion location than it was at the cut location; numeral 424 refers to the computational activity of determining whether a discrepancy is present, and to the digital result of such activity, depending on context
426 prospective code which is being inserted into code 428, or has just been inserted into code 428, or is ready to be inserted into code 428; digital
428 insertion target code, e.g., in a paste operation the target code 428 is the code 130 receiving the pasted code 426, in an autocompletion operation the target code 428 is the code 130 being edited by the autocompletion code 426, in a refactoring operation the target code 428 is the code 130 receiving the refactored code 426, and so on; digital
430 behavior test of a program 132 or portion 130 thereof, e.g., with regard to accuracy or computational performance or security of the program; numeral 430 refers to the computational activity of testing code, or to the tests themselves as digital artifacts, depending on context
432 digital result of testing activity 430
434 weakness finder 210 which employs some AI functionality 322
436 comparison between a generated code 438 and a resident code 440; comparison may be as to identifiers, for example; numeral 436 refers to the computational activity of comparing codes 438 and 440, and to the digital result of such activity, depending on context
438 generated or synthesized code; digital
440 code which is not necessarily generated or synthesized; digital
442 edit cursor in a tool 320; may also be called a "caret"; digital
444 location in code 130 of a cursor 442; digital
446 location in code of a weak spot 208; digital
448 variable in code 130; digital
450 name of a variable in code 130; digital
452 group of weak spots, as represented in a system 202; digital
454 consistency of fixes for a group of weak spots, as represented in a system 202, e.g., consistent use of identifiers within a set of fixes produced by different fixers; digital
456 routine in code 130, e.g., function, method, procedure; digital
458 name of a routine in code 130; digital
460 programming language statement in code, e.g., if statement, function call, assignment statement, loop statement, etc.; digital
462 expression in code, e.g., right hand side of assignment statement, condition in if statement or in loop statement, incoming parameter in procedure call, etc.; digital
464 programming language identifier in code; names 450 and 458 are examples of identifiers 464; digital
466 any step discussed in the present disclosure that has not been assigned some other reference numeral; 466 may thus be shown expressly as a reference numeral for various steps, and may be added as a reference numeral for various steps without thereby adding new matter to the present disclosure
468 automatic code synthesis or automatic code generation, as opposed to code which is created at least in part by human developer directed edits; computational
470 automatic code refactoring, as opposed to code refactoring which is done by human developer directed edits; computational
472 autocompletion, also referred to as "autocomplete"; computational
474 insertion of code into a program using a development tool; computational activity or digital result thereof
476 editing of code using a development tool; computational activity or digital result there
478 filling of a hole in a snippet or other template; computational activity or digital result there
500 weakness analytic item, also called "analysis item", as represented in a system 202

502 detection of a hole 404 or 408; numeral 502 refers to the computational activity of detecting a hole, and to the digital result of such activity, depending on context
504 hole detection functionality, e.g., software which parses a template to locate any holes
506 diagnostic functionality, e.g., lint tool, compiler, or static analyzer
510 match 410 or match 416
512 code 412 or code 418
514 code 414 or code 420
516 confidence score assigned by code generator or code synthesizer; digital
518 competition between suggestions 214 from one or more fixers 212, as represented in a system 202, e.g., a fixer may offer several competing identifiers to fix a weak spot at a variable name; digital
522 evaluation of a set of candidate fixes, e.g., for consistency 454 among themselves or for lack of competition 518 or for discrepancies 424 or matches 510; computational activity
524 digital result of evaluation 522
600 flowchart; 600 also refers to code improvement methods that are illustrated by or consistent with the FIG. 6 flowchart
602 computationally proffer source code to a finder 210, e.g., using an API
606 computationally find a weak spot, e.g., by parsing source code, regular expression matching, parsing diagnostic tool output, parsing test results, comparing portions of code by string comparison or under a text metric, parsing code generator or code synthesizer output, executing a machine learning model or expert system, or otherwise executing a finder 210 consistent with the teachings provided herein
608 computationally select a syntax subtree code which includes a weak spot, e.g., by lexical analysis or parsing or syntax tree traversal based on the location of the weak spot to find a containing subtree code
610 computationally submit weak spot context to a fixer 212, e.g., using an API; this step implicitly includes gathering the context to be submitted
612 computationally receive one or more fix candidates from a fixer 212, e.g., using an API, in response to the submitting 610
614 computationally check the consistency 454 of a set of fix candidates, e.g., with respect to programming language syntax, identifiers, formatting
616 computationally choose one or more fix candidates from a set, e.g., based on evaluation 522 results and a cutoff limiting how many suggestions will be presented
618 computationally present a code strengthening suggestion 214, e.g., by configuring a user interface 124
620 computationally strengthen code by reducing or eliminating weak spots or by reducing the severity of the weaknesses in the code, or both, as to severity, one possible severity scale ranging from more severe to less severe would be: holes, diagnostic errors, failed tests, discrepancies, competing suggestions

CONCLUSION

In short, the teachings herein provide a variety of code improvement functionalities 206 which operate in enhanced systems 202. During software 132 development 318, embodiments find 606 various kinds of weak spots 208 in source code 130 and automatically suggest 618 fixes 214 to strengthen 620 the code 130, without requiring developers 104 to expressly select weakness finder mechanisms 210 or fixer mechanisms 212 by navigating a development tool 320 menu system (not shown). Weakness finders 210 may analyze 314 code 130 using items 500 such as hole 404 or 408 detection 502, diagnostic errors 422, test 430 results 432, changed code 512 matches 510, prospective code 426 discrepancies 424, generated code 438 confidence scores 516, generated suggestion 214 competition 518, and artificial intelligence 322. Weak spots 208 and their context 310 are submitted 610 to weak spot fixers 212, which may generate fix suggestions 214 using functionalities such as code synthesis 468, refactoring 470, autocompletion 472, retesting 430, and artificial intelligence 322. Fix candidate sets 324 may be evaluated 522 for consistency 454, diagnostic errors 422, and discrepancies 424. Snippets 402 may be dynamically filled for presentation to a user.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to help improve source code, the system comprising:
   a digital memory;
   a software development tool having a user interface; and
   at least one processor in operable communication with the digital memory, the at least one processor configured by instructions to upon execution collectively perform syntax subtree code improvement including: finding a weakness in the source code, selecting a syntax subtree code which corresponds to the weakness, submitting a context of the selected syntax subtree code to an artificial intelligence service, receiving a fix candidate from the artificial intelligence service in response to the submitting, and presenting a code strengthening suggestion based on at least the fix candidate;
   wherein the system is configured to select the syntax subtree code by looking for at least one of the following weaknesses: a replacement parameter in a code snippet, the replacement parameter corresponding to a hole where code is to be placed, or a predefined gap in a code template, the predefined gap corresponding to a hole where code is to be placed; and wherein the system is also configured to select the syntax subtree code by looking for at least one of the following weaknesses: a match between a deleted code and a remaining code, the deleted code having been deleted in response to a user action, or a match between a removed code and a remaining code, the removed code having been removed in response to a model action or another automated non-user action.

2. The computing system of claim 1, wherein the system is further configured by instructions which upon execution select the syntax subtree code or another syntax subtree code at least in part by looking for at least one of the following weaknesses:

a match between a prior version of an edited code and a portion of current code;

a discrepancy between a paste prospect and an insertion target source code;

a discrepancy between a generated code and an insertion target source code;

a diagnostic error; or a code behavior test result.

3. The computing system of claim 1, wherein the system comprises an artificial intelligence component which upon execution finds at least one of the weaknesses.

4. The computing system of claim 1, wherein the system comprises a component which is configured to upon execution select the syntax subtree code or another syntax subtree code based on at least a comparison of an automatically generated block of code to a resident block of code.

5. A method to improve a source code, the method comprising automatically:

proffering the source code for first weak spots analysis operations which collectively use at least one of the following analytic items: a replacement parameter in a code snippet, the replacement parameter corresponding to a hole where code is to be placed, or a predefined gap in a code template, the predefined gap corresponding to a hole where code is to be placed, and also proffering the source code for second weak spots analysis operations which collectively use at least one of the following analytic items: a match between a deleted code and a remaining code, the deleted code having been deleted in response to a user action, or a match between a removed code and a remaining code, the removed code having been removed in response to a model action or another automated non-user action;

selecting a syntax subtree code which corresponds to a weak spot found by the weak spots analysis operations;

receiving a fix candidate which is based on at least a context of the syntax subtree code; and presenting a code strengthening suggestion which is based on at least the fix candidate.

6. The method of claim 5, wherein the weak spot corresponds to a replacement parameter in a code snippet, and the context of the syntax subtree code includes at least a portion of the snippet adjacent to the replacement parameter.

7. The method of claim 5, wherein:

the weak spot corresponds to a discrepancy between an insertion prospect and an insertion target source code; and the context of the syntax subtree code includes at least a portion of the insertion prospect, or at least a portion of the insertion target source code, or both.

8. The method of claim 5, wherein the method comprises:

receiving a candidate set which includes multiple fix candidates;

evaluating the candidate set;

choosing a fix candidate for presentation, based on at least a result of the evaluating; and presenting the code strengthening suggestion based on at least the fix candidate.

9. The method of claim 5, wherein the source code is displayed in a tool, a cursor is positioned in the source code at a cursor location, and the syntax subtree code is at a syntax subtree code location which is not adjacent to the cursor location and does not include the cursor location.

10. The method of claim 5, wherein the syntax subtree code exhibits a group of weak spots at non-adjacent locations in the syntax subtree code, and the method comprises:

submitting the context of the syntax subtree code to at least one component which is configured with instructions which upon execution find at least one of the weak spots;

receiving a set of fix candidates from the component in response to the submitting;

checking fix candidates of the set for consistency with one another; and presenting the code strengthening suggestion based on at least two of the fix candidates of the set.

11. The method of claim 5, further comprising analyzing the source code for weak spots using at least a match between a changed portion of the source code which had a weak spot and a separate portion of the source code, and wherein the weak spot found by the analyzing exhibits a weakness in that the separate portion contains at least one of the following which is not present in the changed portion: a variable name, a routine name, an expression configured to yield a value upon evaluation, or a program statement.

12. The method of claim 5, further comprising analyzing the source code for weak spots using at least one of the following discrepancies between the prospective code and the source code: the prospective code contains an identifier which is not present in the source code, or the source code contains an identifier which is not present in the prospective code.

13. The method of claim 5, further comprising analyzing the source code for weak spots using at least competing generated suggestions.

14. The method of claim 5, further comprising analyzing the source code for weak spots using at least an artificial intelligence code functionality which upon execution finds at least one of the weak spots.

15. The method of claim 5, further comprising analyzing the source code for weak spots using at least three of the analytic items.

16. A computer-readable storage device configured with data and instructions which upon execution by a processor cause a computing system to perform a method to optimize a source code, the method comprising:

proffering the source code for first weak spots analysis operations which collectively use at least one of the following analytic items: a replacement parameter in a code snippet, the replacement parameter corresponding to a hole where code is to be placed, or a predefined gap in a code template, the predefined gap corresponding to a hole where code is to be placed, and also proffering the source code for second weak spots analysis operations which collectively use at least one of the following analytic items: a match between a deleted code and a remaining code, the deleted code having been deleted in response to a user action, or a match between a removed code and a remaining code, the removed code having been removed in response to a model action or another automated non-user action;

selecting a syntax subtree code which corresponds to a weak spot found by the weak spots analysis operations;

receiving a fix candidate which is based on at least a context of the syntax subtree code; and presenting a code strengthening suggestion which is based on at least the fix candidate.

17. The computer-readable storage device of claim 16, wherein the method comprises proffering the source code for weak spots analysis operations which collectively use at least three of the analytic items.

18. The computer-readable storage device of claim 16, wherein the method further comprises analyzing the source code for weak spots using at least a diagnostic error.

19. The computer-readable storage device of claim 16, wherein the method further comprises analyzing the source code for weak spots using at least a diagnostic error.

20. The computer-readable storage device of claim 16, wherein the method further comprises analyzing the source code for weak spots using at least a code behavior test result.

* * * * *